(12) United States Patent
Hiramatsu

(10) Patent No.: US 7,683,555 B2
(45) Date of Patent: Mar. 23, 2010

(54) DISCHARGE TUBE LIGHTING CIRCUIT AND ELECTRONIC APPARATUS PROVIDED WITH THE DISCHARGE TUBE LIGHTING CIRCUIT

(75) Inventor: Kiyoshi Hiramatsu, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 345 days.

(21) Appl. No.: 11/928,386

(22) Filed: Oct. 30, 2007

(65) Prior Publication Data

US 2008/0129227 A1    Jun. 5, 2008

Related U.S. Application Data

(63) Continuation of application No. PCT/JP2006/325157, filed on Dec. 18, 2006.

(30) Foreign Application Priority Data

Feb. 28, 2006    (JP)    ............... 2006-053184
Mar. 24, 2006    (JP)    ............... 2006-083646

(51) Int. Cl.
    *H05B 41/24*    (2006.01)
(52) U.S. Cl. .............. 315/255; 315/276; 315/277; 315/224; 315/312; 345/102
(58) Field of Classification Search ............ 315/209 R, 315/224, 246, 255, 276–277, 291, 307, 312; 345/102
    See application file for complete search history.

(56) References Cited

U.S. PATENT DOCUMENTS

| 6,104,146 A * | 8/2000 | Chou et al. ............ 315/277 |
| 6,784,627 B2 * | 8/2004 | Suzuki et al. ............ 315/224 |
| 7,262,558 B2 * | 8/2007 | Hsu ............ 315/307 |
| 7,309,964 B2 * | 12/2007 | Wey et al. ............ 315/312 |
| 2005/0156542 A1 | 7/2005 | Lin |
| 2006/0290453 A1 * | 12/2006 | Park et al. ............ 336/69 |

(Continued)

FOREIGN PATENT DOCUMENTS

JP    9-161980    6/1997

(Continued)

OTHER PUBLICATIONS

Written Opinion of the International Search Report dated Feb. 20, 2007.

*Primary Examiner*—Douglas W Owens
*Assistant Examiner*—Ephrem Alemu
(74) *Attorney, Agent, or Firm*—Keating & Bennett, LLP

(57) ABSTRACT

In a backlight, for example, a pair of U-shaped discharge tubes are connected to connectors of a discharge tube lighting circuit. A secondary output voltage of a first transformer is applied to a first end of one U-shaped discharge tube via a power supply electrode. A secondary output voltage of a second transformer is applied to a first end of the other U-shaped discharge tube via a power supply electrode. A secondary output voltage of a third transformer is applied in common to the other (second) ends of the U-shaped discharge tubes via other power supply electrodes. The secondary output voltages of the first and second transformers are the same in polarity, and are opposite to the secondary output voltage of the third transformer in polarity.

11 Claims, 6 Drawing Sheets

U.S. PATENT DOCUMENTS

2007/0262727 A1* 11/2007 Suzuki et al. ............... 315/219
2009/0146577 A1* 6/2009 Yamasaki et al. ........... 315/257

FOREIGN PATENT DOCUMENTS

| JP | 2004-273396 | 9/2004 |
| JP | 2004-335422 | 11/2004 |
| JP | 2005-32940 | 2/2005 |

* cited by examiner (B)

DISCHARGE TUBE LIGHTING CIRCUIT AND ELECTRONIC APPARATUS PROVIDED WITH THE DISCHARGE TUBE LIGHTING CIRCUIT

CROSS-REFERENCE TO RELATED APPLICATIONS

This is a continuation under 35 U.S.C. § 111(a) of PCT/JP2006/325157 filed Dec. 18, 2006, and claims priority of JP2006-083646 filed Mar. 24, 2006 and JP2006-053184 filed Feb. 28, 2006, incorporated by reference.

BACKGROUND

1. Technical Field

The present disclosure relates to discharge tube lighting circuits for activating discharge tubes such as cold-cathode tubes. More particularly, the disclosure relates to a discharge tube lighting circuit for activating a U-shaped discharge tube or a pseudo U-shaped discharge tube (in the following, a pseudo U-shaped discharge tube is also merely referred to as a U-shaped discharge tube), and an electronic apparatus having a backlight provided with the discharge tube lighting circuit.

2. Background Art

Currently, cold-cathode tubes (discharge tubes) are used for backlights of large liquid crystal displays. Such discharge tubes include U-shaped discharge tubes and pseudo U-shaped discharge tubes. The U-shaped discharge tube is obtained by bending a single long discharge tube at a center portion thereof into a U-shape or an approximate U-shape. The pseudo U-shaped discharge tube is obtained by connecting two I-shaped or approximately I-shaped discharge tubes. In backlights of such displays, a plurality of U-shaped discharge tubes are usually disposed. For example, in the case of a backlight for a liquid crystal display with a 30 to 40-inch screen, over ten U-shaped discharge tubes are disposed.

In Japanese Unexamined Patent Application Publication No. 2005-5059 (JP '059), a discharge tube lighting circuit for activating U-shaped discharge tubes is disclosed.

Here, a simplified exemplary configuration of a discharge tube lighting circuit will be described with reference to the above-described document. FIG. 1 shows a discharge tube lighting circuit for activating two U-shaped discharge tubes. In a backlight 101, U-shaped discharge tubes 102A and 102B are connected to a discharge tube lighting circuit 105. The U-shaped discharge tube 102A is a pseudo U-shaped discharge tube obtained by connecting two I-shaped discharge tubes 103A and 103B. The U-shaped discharge tube 102B is a pseudo U-shaped discharge tube obtained by connecting two I-shaped discharge tubes 103C and 103D.

Power supply electrodes 104A to 104D for the I-shaped discharge tubes 103A to 103D are connected to resonant capacitors C1A to C1D included in the discharge tube lighting circuit 105 and transformers T1A to T1D included in the discharge tube lighting circuit 105, respectively. The transformers T1A to T1D are connected to the power supply electrodes so that output voltages of secondary windings N2A and N2B can be opposite in polarity at both ends of the U-shaped discharge tube 102A and output voltages of secondary windings N2C and N2D can be opposite in polarity at both ends of the U-shaped discharge tube 102B. On the primary sides of the transformers T1A to T1D, primary windings N1A to N1D are connected in parallel, and this parallel circuit is connected to a high-frequency driving circuit 110.

The high-frequency driving circuit 110 is an inverter that supplies an AC voltage to the U-shaped discharge tubes 102A and 102B via the transformers T1A to T1D. The transformers T1A to T1D boost the primary voltage in accordance with a turns ratio thereof, and set the boosted voltage as a predetermined secondary output voltage (1 to 2 kV). In each of the U-shaped discharge tubes 102A and 102B, the secondary output voltages of opposite polarity are individually applied to terminals of the U-shaped discharge tube. Thus, the U-shaped discharge tube is driven by a drive voltage of approximately 2 to 4 kV that is obtained by adding amplitudes of the secondary output voltages applied to the terminals thereof.

Thus, voltages of opposite polarity are individually applied to terminals of a U-shaped discharge tube. Accordingly, a drive voltage required for driving the U-shaped discharge tube can be supplied from both terminals thereof to the U-shaped discharge tube in a distributed manner, whereby a rated output voltage of a transformer connected to each of the terminals can be reduced. Furthermore, all terminals of a plurality of U-shaped discharge tubes are individually connected to transformers that are independent of each other. Accordingly, a voltage across each of the U-shaped discharge tubes is set as a predetermined drive voltage therefor so as to cause the U-shaped discharge tube to emit light regardless of lighting of other U-shaped discharge tubes.

When the above-described U-shaped discharge tube emits light at startup (first lighting), a high starting voltage is required. However, a drive voltage for allowing the U-shaped discharge tube to continuously emit light is lower than the starting voltage. Accordingly, a low set-up ratio is set for each transformer, and a capacitor that series-resonates with a leakage inductance of a secondary winding is disposed for each transformer so as to compensate for the undervoltage at startup. The U-shaped discharge tube is started up using characteristics of this series resonance in which a set-up ratio increases around a resonance point.

Recently, with the increase in size of liquid crystal displays, the number of U-shaped discharge tubes disposed in a liquid crystal display has increased. Discharge tube lighting circuits having the above-described configuration require the same number of transformers and resonant capacitors as the number of terminals of U-shaped discharge tubes. Accordingly, with increasing number of U-shaped discharge tubes to be disposed, it is necessary to increase the number of components such as transformers and resonant capacitors.

The increase in the number of components leads to an increase in manufacturing cost, an increase in component cost, an increase in size of apparatuses, and a deterioration in reliability. Accordingly, these problems have to be solved. Furthermore, since the increase in the number of components leads to an increase in footprint for transformers, the number of U-shaped discharge tubes to be disposed is limited.

SUMMARY

Accordingly, the present disclosure provides a discharge tube lighting circuit with a simple configuration in which the reduced number of components are disposed so as to improve reliability for the discharge tube lighting circuit, achieve cost reduction, increase the number of U-shaped discharge tubes to be disposed, and produce a high luminance of a backlight included in an electronic apparatus.

In order to solve the above-described problems, one aspect provides a discharge tube lighting circuit provided with a high-frequency driving circuit and a plurality of transformers each including a primary winding and a secondary winding, the primary windings being connected in parallel to the high-frequency driving circuit and each of the secondary windings being connected to a terminal of a U-shaped discharge tube.

The discharge tube lighting circuit may include: a first electrode connected to one terminal of one of two U-shaped discharge tubes; a second electrode connected to one terminal of the other one of the two U-shaped discharge tubes; and a third electrode connected to the other terminals of the two U-shaped discharge tubes.

For example, the secondary winding included in a first transformer among the plurality of transformers is connected to the first electrode, the secondary winding included in a second transformer among the plurality of transformers is connected to the second electrode, and the secondary winding included in a third transformer among the plurality of transformers is connected to the third electrode so that voltages applied to the first and second electrodes can be the same in polarity, and a voltage applied to the third electrode can be opposite in polarity to the voltage applied to the first and second electrodes.

Accordingly, the number of transformers can be reduced as compared with known discharge tube lighting circuits. The first and second transformers are connected to the first and second electrodes (hereinafter referred to as independent electrodes), respectively, to which one terminal of one of the two U-shaped discharge tubes and one terminal of the other one of the two U-shaped discharge tubes are connected. Only the third transformer is connected to the third electrode (hereinafter referred to as a common electrode) to which the other terminals of the two U-shaped discharge tubes are connected. That is, a total of three transformers are connected to the two U-shaped discharge tubes. Thus, the number of components can be reduced.

In the discharge tube lighting circuit having the above-described configuration, even though the secondary winding of the third transformer is connected in parallel to both of the U-shaped discharge tubes via the common electrode, the U-shaped discharge tubes can continuously emit light together, because secondary output voltages are separately supplied from the first and second transformers to the other independent electrodes of the U-shaped discharge tubes. In addition, if resonant capacitors are disposed, a single resonant capacitor is disposed for each terminal, that is, a total of three resonant capacitors are disposed for the two U-shaped discharge tubes. Thus, the number of components can be reduced.

Furthermore, a diameter of the secondary winding included in the third transformer according to another aspect of the present invention may be larger than that of the secondary windings included in the first and second transformers.

In the discharge tube lighting circuit having the above-described configuration, a combined current passes through the third transformer connected to the common electrode so as to supply the current to the two U-shaped discharge tubes. Accordingly, a diameter larger than that of the secondary windings included in the first and second transformers connected to the independent electrodes is set as the diameter of the secondary winding included in the third transformer connected to the common electrode, whereby the copper loss that occurs in the third transformer and the heat generation that occurs at the secondary winding thereof can be reduced.

Still furthermore, a core cross-sectional area of the third transformer may be larger than that of the first and second transformers.

In this configuration, a core cross-sectional area larger than that of the first and second transformers connected to the independent electrodes is set as the core cross-sectional area of the third transformer connected to the common electrode, whereby the iron loss that occurs in the third transformer and the heat generation that occurs at the core thereof can be reduced.

The transformer is magnetically coupled between the primary windings and the secondary windings, but the ratio of the magnetic coupling is not 100%. One source of loss in the magnetic coupling is due to leakage inductance.

Still furthermore, when the discharge tubes are used for backlighting in an LCD display, reflectors are disposed adjacent to the discharge tubes for reflecting the light from the discharge tubes. Parasitic capacitances are generated between the output line and the ground line or between the discharge tubes and the reflectors.

Therefore, in another aspect of the present invention, resonance voltages are individually set for the two U-shaped discharge tubes on the basis of parasitic capacitances distributed around portions between the secondary windings included in the first to third transformers and the first to third electrodes, and leakage inductances of the first to third transformers.

Accordingly, the need for individually disposing resonant capacitors for both terminals of each U-shaped discharge tube may be eliminated, so that the number of components can be further reduced.

Still furthermore, the first to third transformers according to a further aspect may have a common magnetic core that forms a closed magnetic path, and the secondary windings included in the first to third transformers are individually wound around the common magnetic core.

Thus, modularization is performed by integrating the individual transformers, whereby the number of magnetic core components and the footprint for transformers can be reduced.

Still furthermore, in yet another aspect, one or two primary windings may be wound around the common magnetic core, and are then magnetically coupled to all of the secondary windings included in the first to third transformers.

Accordingly, the number of primary windings can be reduced, a simple modularized configuration in which the first to third transformers are integrated can be achieved, and the winding operation of the primary winding can be easily performed in the manufacturing process.

Still furthermore, in another aspect, one primary winding is wound around the common magnetic core, and is then magnetically coupled to all of the secondary windings included in the first to third transformers. In addition, the common magnetic core has at least three magnetic legs, the secondary windings included in the first to third transformers are individually wound around different magnetic legs, and the one primary winding is wound around any one of the magnetic legs around which the secondary windings are wound or another magnetic leg around which no secondary winding is wound.

Accordingly, currents passing through the individual secondary windings can be determined without using a plurality of primary windings and without being affected by the difference in accuracy between the primary windings. Consequently, secondary outputs can be stabilized. In addition, the two secondary windings connected to the independent electrodes are individually wound around magnetic legs around which no primary winding is wound, whereby the secondary outputs can be equalized.

Still furthermore, in a further aspect, an electronic apparatus has a backlight that is provided with any one of the above-described discharge tube lighting circuits and a discharge tube such as a cold-cathode tube driven by the discharge tube lighting circuit.

Accordingly, more U-shaped discharge tubes can be disposed in the backlight using the discharge tube lighting circuit with a simple configuration and the reduced footprint for transformers.

A U-shaped discharge tube lighting circuit with a reduced number of power supply terminals for the U-shaped discharge tubes, a reduced number of transformers connected to individual terminals, and a reduced number of resonant capacitors connected to individual terminals can be provided. Thus, an increase in the number of components is prevented, whereby increases in manufacturing cost, component cost, size, and unreliability of a high-voltage output unit can be prevented. As a result, the footprints for transformers and capacitors, which are limiting factors for the number of U-shaped discharge tubes to be disposed, can be reduced, whereby the number of U-shaped discharge tubes to be disposed can be increased.

Other features and advantages will become apparent from the following description of embodiments which refers to the accompanying drawings.

DETAILED DESCRIPTION

Figure 1:
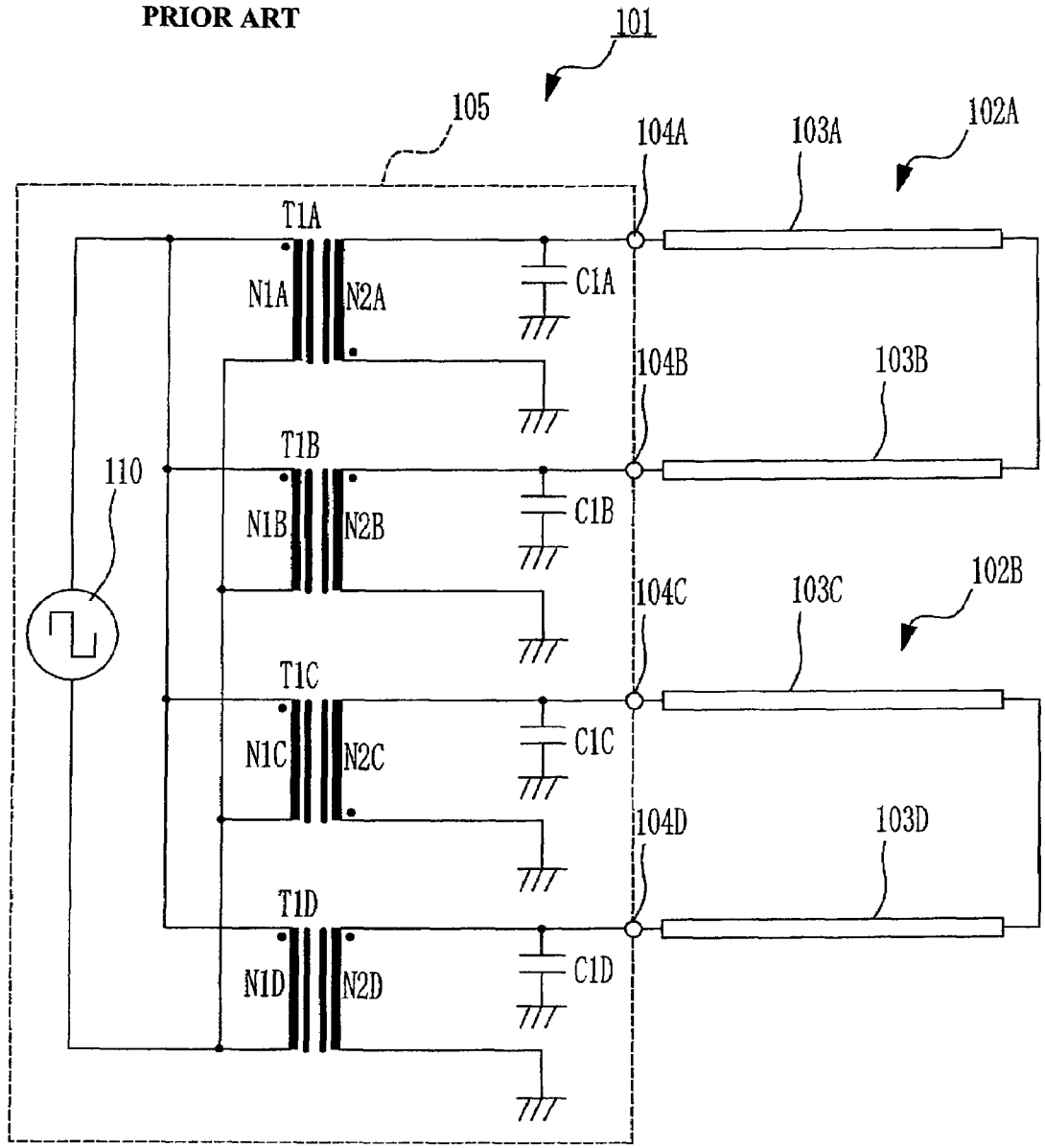
FIG. 1 is a diagram describing a configuration of a known backlight.

Reference Numerals 1, 21, 101 backlight
2, 102 U-shaped discharge tube
3, 103 I-shaped discharge tube
4, 404 power supply electrode
5, 25, 105 discharge tube lighting circuit
6 connector
8 current detection circuit
10, 110 high-frequency driving circuit
22 E-shaped magnetic core
23 bobbin
24 secondary terminal
26 primary terminal
27 divider
62 LCD display unit
80 housing
C1 resonant capacitor
T1 transformer
T2, T3 transformer module
N1 primary winding
N2 secondary winding A discharge tube lighting circuit for activating four U-shaped discharge tubes according to a first embodiment will be described. In other examples, several to over ten U-shaped discharge tubes may be disposed in a backlight used for a liquid crystal display. Here, in order to avoid complicated explanation, a configuration in which four U-shaped discharge tubes are disposed will be described.

Figure 2:
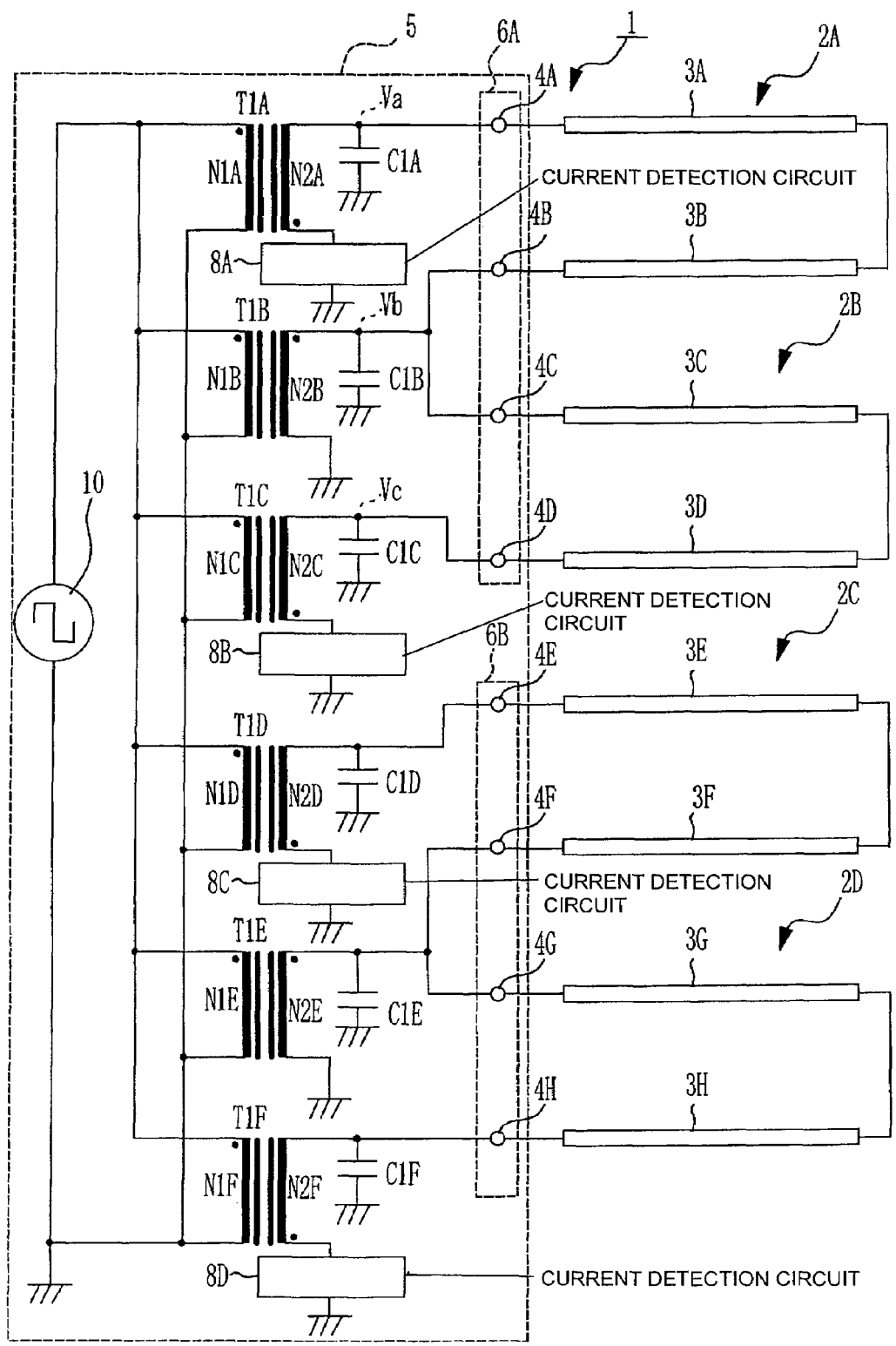
FIG. 2 is a diagram describing a backlight according to a first embodiment and a discharge tube lighting circuit according to the first embodiment.

FIG. 2 is a diagram showing a circuit configuration of a discharge tube lighting circuit according to this embodiment. A backlight 1 used for a liquid crystal display is provided with U-shaped discharge tubes 2A to 2D and a discharge tube lighting circuit 5. The U-shaped discharge tubes 2A and 2B are connected to the discharge tube lighting circuit 5 via a connector 6A. The U-shaped discharge tubes 2C and 2D are connected to the discharge tube lighting circuit 5 via a connector 6B.

Figure 6:
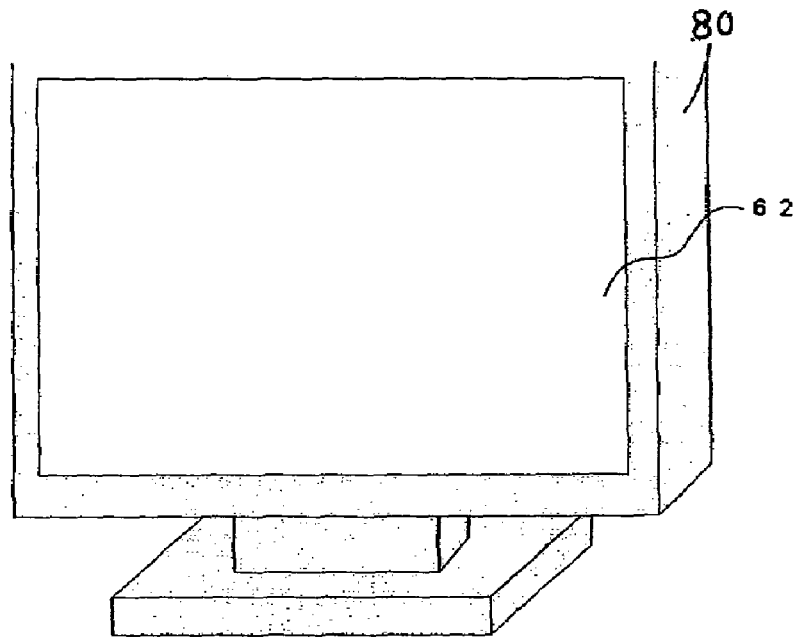
FIG. 6a is a perspective view of a conventional electronic apparatus (a video monitor in this example) including a housing 80 and an LCD display unit 62.
FIG. 6b is a plan view showing a backlight similar to that in FIG. 2 disposed in the LCD display unit 62.

FIG. 6a is a perspective view of a conventional electronic apparatus (a video monitor in this example) including a housing 80 and an LCD display unit 62.

Figure 6B:
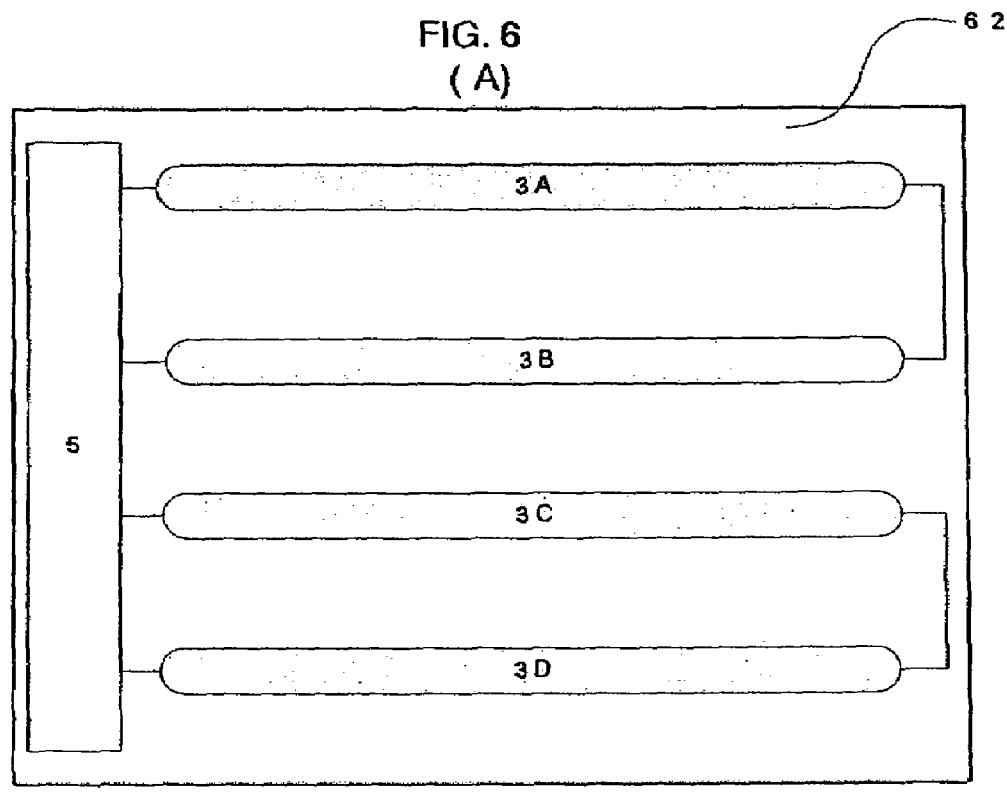

FIG. 6b is a plan view showing a backlight similar to that in FIG. 2 disposed in the LCD display unit 62.

The connector 6A includes power supply electrodes 4A to 4D, and connects an I-shaped discharge tube 3A to the transformer T1A via the power supply electrode 4A, and an I-shaped discharge tube 3D to the transformer T1C via the power supply electrode 4D. The power supply electrodes 4A and 4D are independent electrodes. The power supply electrodes 4B and 4C are connected to the transformer T1B on a mounting substrate. The power supply electrodes 4B and 4C form a common electrode with a connecting line (not shown) disposed on the mounting substrate. In this embodiment, the power supply electrodes 4B and 4C are connected on the mounting substrate instead of within a connector. However, even if the power supply electrodes 4B and 4C are connected within a connector, the present invention can be achieved.

The connector 6B has the same configuration as that of the connector 6A, and connects an I-shaped discharge tube 3E to the transformer T1D, I-shaped discharge tubes 3F and 3G to a transformer T1E, and an I-shaped discharge tube 3H to a transformer T1F. Power supply electrodes 4F and 4G form a common electrode. Power supply electrodes 4E and 4H are independent electrodes.

Each of the four U-shaped discharge tubes 2A to 2D is a pseudo U-shaped discharge tube composed of two I-shaped discharge tubes. The U-shaped discharge tube 2A is obtained by connecting one end of the I-shaped discharge tube 3A and one end of the I-shaped discharge tube 3B. The U-shaped discharge tube 2B is obtained by connecting one end of the I-shaped discharge tube 3C and one end of the I-shaped discharge tube 3D. The U-shaped discharge tube 2C is obtained by connecting one end of the I-shaped discharge tube 3E and one end of the I-shaped discharge tube 3F. The U-shaped discharge tube 2D is obtained by connecting one end of the I-shaped discharge tube 3G and one end of the I-shaped discharge tube 3H. These I-shaped discharge tubes 3A to 3H are disposed on a back of a liquid crystal panel (not shown) at equal spacings.

The discharge tube lighting circuit 5, which is an inverter disposed on the mounting substrate in this example, generates an AC voltage of a predetermined frequency from a DC voltage transmitted from a power supply (not shown) included in an electronic apparatus. The discharge tube lighting circuit 5 is provided with the connectors 6A and 6B, capacitors C1A to C1F, the transformers T1A to T1F that have primary windings N1A to N1F and secondary windings N2A to N2F, respectively, current detection circuits 8A to 8D, and a high-frequency driving circuit 10.

The high-frequency driving circuit 10 included in the discharge tube lighting circuit 5 generates a primary voltage having a rectangular wave from a DC voltage transmitted from the power supply included in the electronic apparatus, and applies the generated primary voltage to the primary windings N1A to N1F of the transformers T1A to T1F. More specifically, the primary voltage is controlled using a half-bridge or full-bridge switching circuit so that the primary voltage has a rectangular wave of an on duty ratio of 50%. The details of this control process are not related to the feature of the present invention, and description thereof will be therefore omitted. A commonly performed switching control process may be performed. Furthermore, the on duty ratio is not limited to 50%.

The primary windings N1A to N1F of the transformers T1A to T1F included in the discharge tube lighting circuit 5 are connected in parallel, and the parallel circuit is connected to the high-frequency driving circuit 10. Here, winding terminal ends of the primary windings N1A to N1F of the transformers T1A to T1F are connected to the ground. This connection method varies in accordance with a switching circuit used. The transformers T1B and T1E, each of which is a third transformer, are individually connected to the common electrodes. Winding start ends of secondary windings of the transformers T1B and T1E are individually connected to the common electrodes, and winding terminal ends thereof are connected to the ground. Here, a current detection circuit may be connected between the winding terminal end and the ground. On the other hand, the transformers T1A, T1C, T1D, and T1F, each of which is a first or second transformer, are individually connected to independent electrodes. Winding terminal ends of secondary windings of the transformers T1A, T1C, T1D, and T1F are individually connected to the independent electrodes. The current detection circuits 8A, 8B, 8C and 8D are connected between winding start ends of the secondary windings of the transformers T1A, T1C, T1D, and T1F and the ground, respectively. Thus, the transformers T1A to T1F are configured in the above-described manner so that secondary AC output voltages of the transformers T1B and T1E connected to the common electrodes and secondary AC output voltages of the transformers T1A, T1C, T1D, and T1F connected to the independent electrodes can become opposite in polarity. Furthermore, diameters of the primary and secondary windings of the transformers T1B and T1E connected to the common electrodes are larger than those of the primary and secondary windings of the other transformers. Core cross-sectional areas of the transformers T1B and T1E are larger than those of the other transformers. Consequently, copper losses that occur in the primary and secondary windings of the transformers T1B and T1E, across each of which a mixed current passes, and iron losses that occur in cores are prevented, and a temperature increase is reduced.

The capacitors C1A, C1B, C1C, C1D, C1E, and C1F included in the discharge tube lighting circuit 5 are connected between the secondary windings of the transformers T1A, T1B, T1C, T1D, T1E, and T1F and the ground, respectively. When the backlight is driven to emit light at startup, these capacitors C1A, C1B, C1C, C1D, C1E, and C1F series-resonate with leakage inductances of the transformers T1A, T1B, T1C, T1D, T1E, and T1F, respectively, and apply a high voltage required for lighting to the U-shaped discharge tubes 2A to 2D. The capacitors C1A to C1F are not necessarily required to be disposed in the discharge tube lighting circuit 5. If the frequency of a secondary output voltage is high, a resonance voltage can be obtained by using parasitic capacitances distributed around a portion from the secondary winding of each transformer to the connector 6A or 6B and in the U-shaped discharge tube instead of the capacitors C1A to C1F.

The current detection circuits 8A, 8B, 8C, and 8D included in the discharge tube lighting circuit 5 are configured to detect tube currents of the U-shaped discharge tubes 2A, 2B, 2C, and 2D, respectively, and are used to stabilize the tube currents. A configuration achieving the stabilization of the tube current is not related to the features herein, and the description thereof will be therefore omitted. A common configuration may be used.

The backlight 1 and the discharge tube lighting circuit 5, which have the above-described configurations, cause the U-shaped discharge tubes 2A to 2D to emit light. It is desirable that the number of turns, a turns ratio, the degree of coupling between the primary side and the secondary side, and a leakage inductance of each of the transformers T1A to T1F be controlled so that the output characteristics of the transformers T1A to T1F are almost the same. In addition, it is desirable that the capacitances of the capacitors C1A to C1F be controlled so that the output characteristics of the transformers T1A to T1F are almost the same.

Next, operations at the time of continuous lighting will be described.

The high-frequency driving circuit 10 switches a direct current supplied from the power supply included the electronic apparatus using a half-bridge switching circuit (not shown) so as to apply the direct current to the transformers T1A to T1F.

A primary voltage having a rectangular wave, which is an output voltage of the high-frequency driving circuit 10, is applied to the primary windings N1A to N1F of the transformers T1A to T1F. Each of the transformers T1A to T1F boosts the primary voltage in accordance with a turns ratio thereof, and sets the boosted voltage as a predetermined secondary output voltage. More specifically, in each of the primary windings N1A to N1F, an exciting current flows from the winding start end to the winding terminal end in a positive voltage output period. Consequently, a magnetic flux of a core of each of the transformers T1A to T1F increases with time, and in each of the secondary windings N2A to N2F, a current flows from the winding terminal end to the winding start end. On the other hand, in a negative voltage output period, a magnetic flux of a core of each of the transformers T1A to T1F decreases with time, and in each of the secondary windings N2A to N2F, a current flows from the winding start end to the winding terminal end. The winding start and terminal ends of the transformers T1B and T1E and the winding start and terminal ends of the other transformers are inversely connected to connection points. Accordingly, the transformers T1B and T1E output secondary output voltages whose polarities are opposite to those of the secondary output voltages output from the other transformers. Furthermore, the I-shaped discharge tubes 3B and 3C are connected to one common electrode, and the I-shaped discharge tubes 3F and 3G are connected to another common electrode. Accordingly, a mixed current that is twice the currents passing through the transformers T1A, T1C, T1D, and T1F, which are connected to the independent electrodes, flows through the transformers T1B and T1E, which are connected to the common electrodes.

Figure 3:
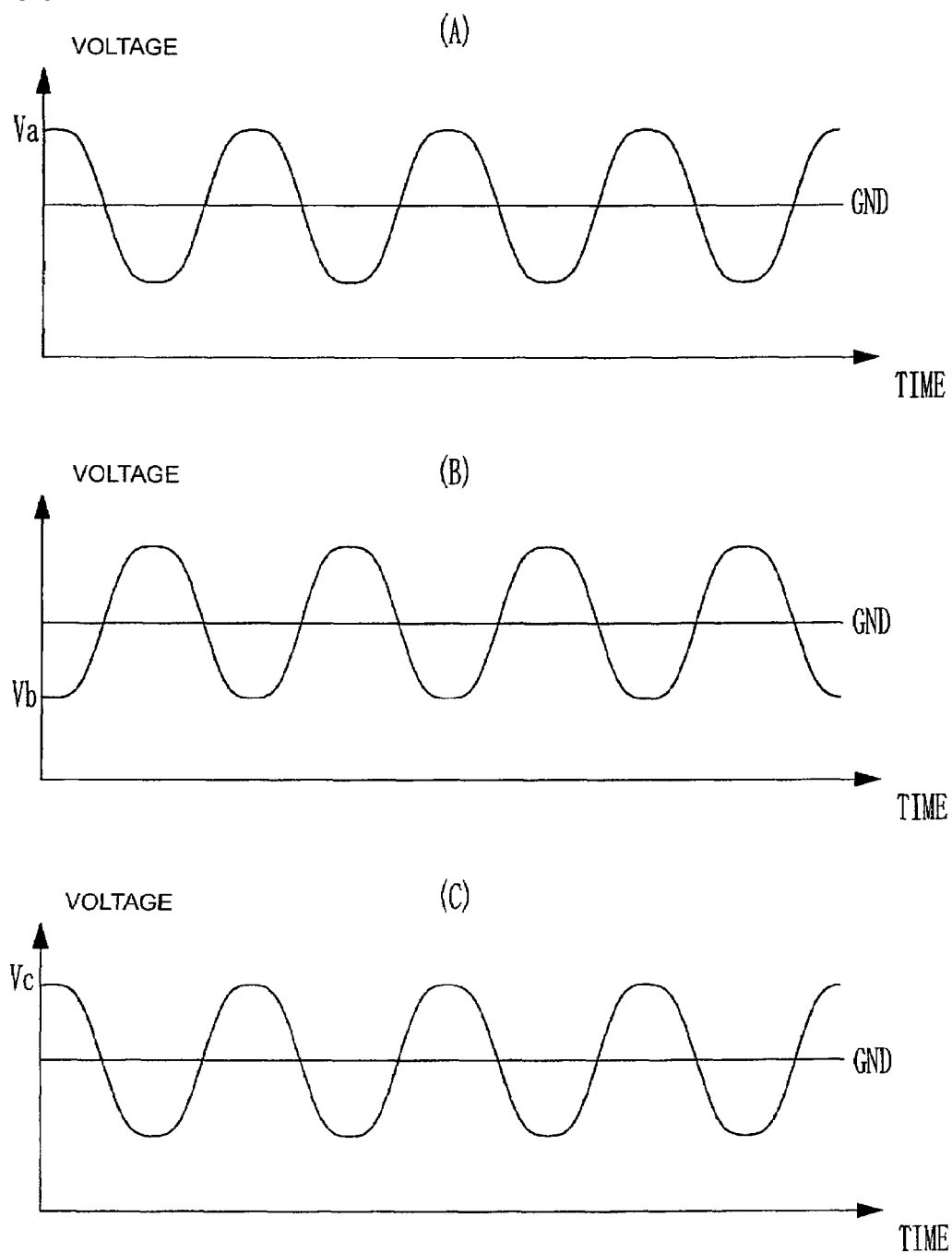
FIG. 3 is a diagram describing an output waveform on the secondary side of each transformer.

Here, voltage waveforms of the secondary output voltages of individual transformers are shown in FIG. 3. FIG. 3(A) shows a voltage waveform of a secondary output voltage Va of the transformer T1A. FIG. 3(B) shows a voltage waveform of a secondary output voltage Vb of the transformer T1B. FIG. 3(C) shows a voltage waveform of a secondary output voltage Vc of the transformer T1C.

The secondary output voltages Va to Vc of the transformers T1A to T1C have waveforms of sine waves of the same frequency. The secondary output voltages Va and Vc of the transformers T1A and T1C connected to the independent electrodes have waveforms of sine waves of the same phase. The secondary output voltage Vb of the transformer T1B connected to the common electrode is opposite to the secondary output voltages Va and Vc in polarity, that is, has a waveform of a sine wave that is 180° out of phase. Waveforms of the secondary output voltages of the transformers T1D, T1E, and T1F, which are not shown in the drawings, are the same as those of the secondary output voltages Va, Vb, and Vc of the transformers T1A, T1B, and T1C, respectively.

The secondary output voltages Va and Vb of the opposite polarity are individually applied to terminals of the U-shaped discharge tube 2A. Accordingly, a voltage between the terminals becomes a voltage amplitude (2 to 4 kV) obtained by adding voltage amplitudes (1 to 2 kV) of the secondary output voltages Va and Vb. That is, a drive voltage that is twice the secondary output voltages Va and Vb is applied between the terminals. In the cases of the U-shaped discharge tubes 2B, 2C, and 2D, the secondary output voltages of the opposite polarity are similarly individually applied to terminals of the U-shaped discharge tube. That is, a high drive voltage is applied between the terminals.

The secondary output voltage Vb is applied from the common electrode to the U-shaped discharge tubes 2A and 2B. However, the secondary output voltages Va and Vc are separately applied to the independent electrodes for the U-shaped discharge tubes 2A and 2B. Accordingly, even if the U-shaped discharge tubes 2A and 2B are connected in parallel to the common electrode, the U-shaped discharge tubes 2A and 2B can emit light. In addition, the U-shaped discharge tubes 2C and 2D can also emit light.

By using the above-described configuration, the number of transformers for generating a high voltage and the number of resonant capacitors can be reduced by three-quarters as compared with a discharge tube lighting circuit having a known configuration. As a result, it is possible to provide a discharge tube lighting circuit with a simple configuration and small footprints for transformers and capacitors. Accordingly, on a mounting substrate of a discharge tube lighting circuit having the same area as a mounting substrate of a known discharge tube lighting circuit, more discharge tubes can be disposed so as to form a backlight. In this case, a liquid crystal display capable of achieving a higher luminance can be obtained. Furthermore, since the number of components to be disposed in a high-voltage output unit, for which high reliability is required, can be reduced, the reliability for the high-voltage output unit can be improved more than before.

Furthermore, two U-shaped discharge tubes can be connected to a single connector together. In known configurations, in order to maintain insulation between adjacent terminals of different U-shaped discharge tubes, it is necessary to separately dispose connectors for U-shaped discharge tubes. However, in a configuration according to the present invention, for example, if the power supply electrodes 4B and 4C forming a common electrode are connected adjacent to each other, terminals of different U-shaped discharge tubes have the same potential. Accordingly, even if two U-shaped discharge tubes are connected to a single connector, insulation between them can be ensured. Consequently, the number of connectors to be disposed in the entire discharge tube lighting circuit can be reduced, a working process for connection can be simplified, and the number of working processes can be reduced. Furthermore, since a drive voltage for each U-shaped discharge tube is distributed between both terminals of the U-shaped discharge tube, a rated output voltage of each of the transformers T1A to T1F can be reduced and the transformers T1A to T1F with a simple configuration can be used.

An exemplary configuration in which four U-shaped discharge tubes are used to form a backlight has been described. However, more U-shaped discharge tubes may be used to configure a backlight. In this case, if a backlight is configured so that a single transformer is disposed for a common electrode used by two U-shaped discharge tubes, the present invention can be achieved.

Furthermore, in this embodiment, an exemplary circuit configuration on the primary side in which transformers are connected in parallel to a high-frequency driving circuit has been described. However, the present invention can be achieved using any circuit configuration on the primary side. In a circuit configuration on the secondary side, if a voltage to be applied to a common electrode and a voltage to be applied to an independent electrode are opposite in polarity, the present invention can be achieved.

Next, a discharge tube lighting circuit for activating two U-shaped discharge tubes according to a second embodiment will be described by way of example. In this embodiment, a transformer module in which a plurality of transformers are disposed in a single magnetic core is used instead of the transformers shown in the first embodiment.

Figure 4:
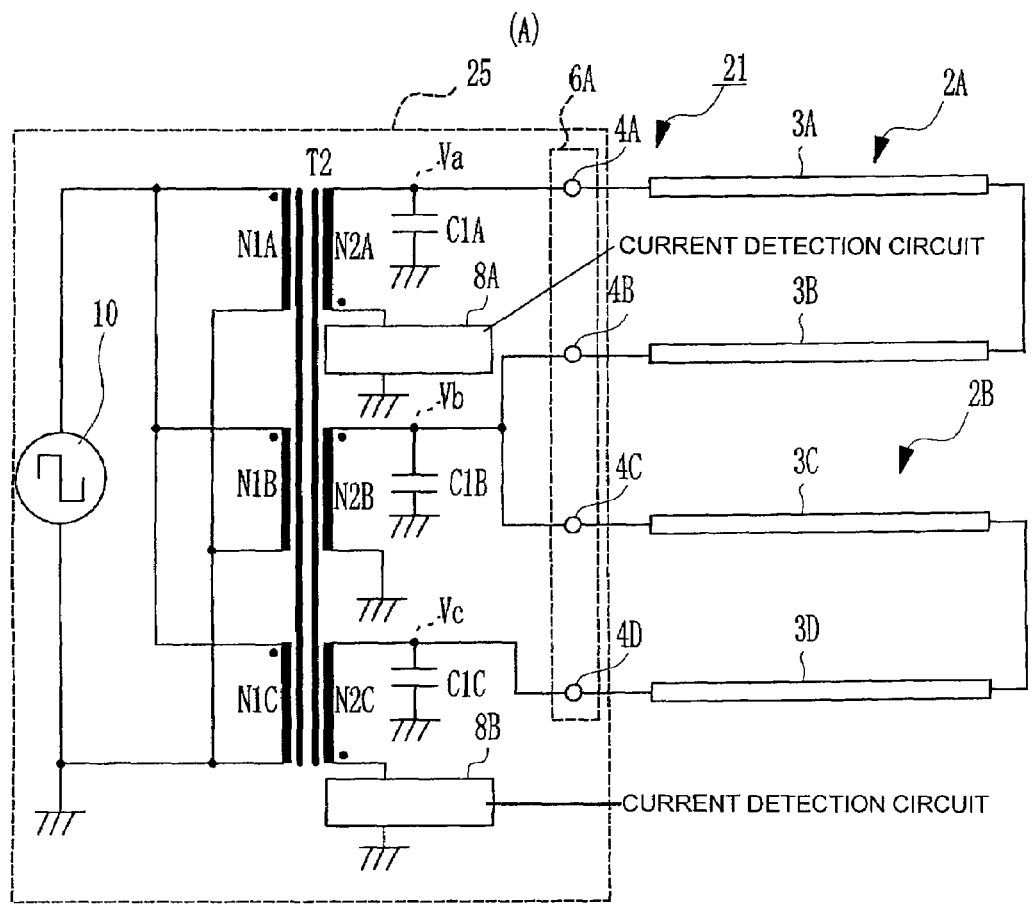
FIG. 4 is a diagram describing configurations of a discharge tube lighting circuit according to a second embodiment and a transformer module according to the second embodiment.
Figure 4:
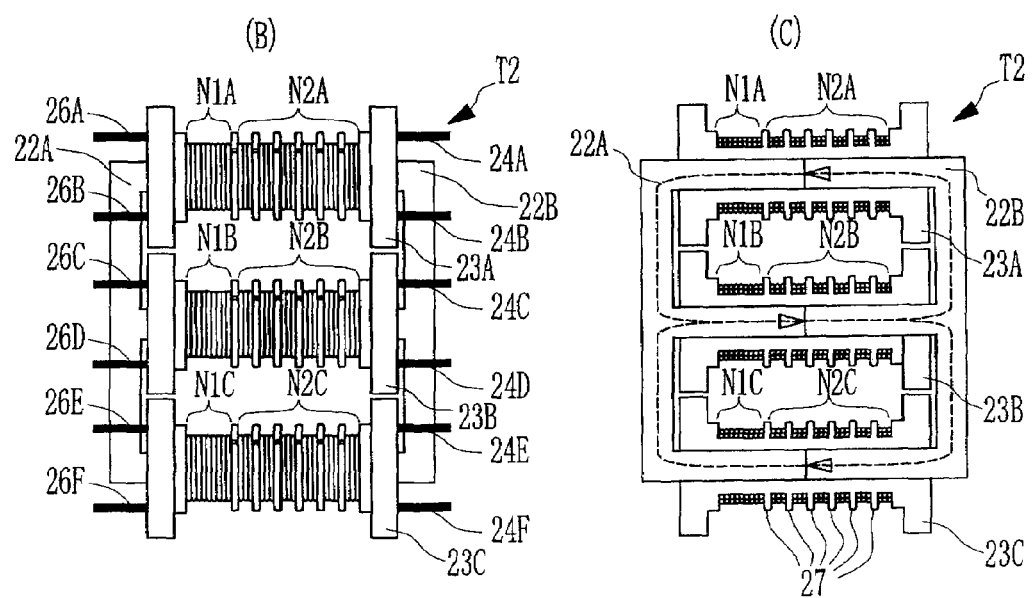

A backlight 21 whose circuit configuration is shown in FIG. 4(A) is used for a liquid crystal display device, and is provided with the U-shaped discharge tubes 2A and 2B, and a discharge tube lighting circuit 25. The U-shaped discharge tubes 2A and 2B are connected to the discharge tube lighting circuit 25 via the connector 6A. The connector 6A includes the power supply electrodes 4A to 4D. The power supply electrodes 4A and 4D are independent electrodes. The power supply electrodes 4B and 4C form a common electrode using a connection line (not shown) disposed on a mounting substrate.

The discharge tube lighting circuit 25, which in this example is an inverter disposed on the mounting substrate, generates an AC voltage of a predetermined frequency from a DC voltage supplied from a power supply (not shown) included in an electronic apparatus. The discharge tube lighting circuit 25 is provided with the connector 6A, the capacitors C1A to C1C, a transformer module T2 obtained by winding the primary windings N1A to N1C and the secondary windings N2A to N2C around a pair of magnetic cores, the current detection circuits 8A and 8B, and the high-frequency driving circuit 10.

Here, the detailed configuration of the transformer module T2 included in the discharge tube lighting circuit 25 is shown in FIGS. 4(B) and 4(C). FIG. 4(B) is a schematic diagram, and FIG. 4(C) is a cross-sectional view. The transformer module T2 is provided with two E-shaped magnetic cores 22A and 22B, three bobbins 23A to 23C, the primary windings N1A to N1C, and the secondary windings N2A to N2C. The E-shaped magnetic cores 22A and 22B each including three magnetic legs are similar in shape, and form closed magnetic paths in which the three magnetic legs of the E-shaped magnetic core 22A individually abut against the three magnetic legs of the E-shaped magnetic core 22B. The three magnetic legs of each of the E-shaped magnetic cores 22A and 22B are inserted in the bobbins 23A to 23C.

Each of the bobbins 23A to 23C includes a plurality of dividers 27 disposed around the perimeter thereof. In a region at one end of the corresponding bobbin which includes one of a plurality of sections divided by the dividers 27, the primary windings N1A to N1C are individually wound. In a region at the other end of the corresponding bobbin which includes the other sections divided by the dividers 27, each of which is smaller than the above-described section, the secondary windings N2A to N2C are individually wound while being extracted. In this embodiment, regions in which the secondary windings N2A to N2C are to be wound are individually divided by the dividers 27 so as to prevent the occurrence of a large potential difference between overlapping secondary windings. Each of the bobbins 23A to 23C includes two primary terminals 26 to which both ends of the primary winding N1 are connected and two secondary terminals 24 to which both ends of the secondary winding N2 are connected. More specifically, the winding start ends (left ends in the drawing) of the primary windings N1A, N1B, and N1C are connected to primary terminals 26A, 26C, and 26E, respectively. The winding terminal ends (right ends in the drawing) of the primary windings N1A, N1B, and N1C are connected to primary terminals 26B, 26D, and 26F, respectively. The winding start ends (left ends in the drawing) of the secondary windings N2A, N2B, and N2C are connected to secondary terminals 24A, 24C, and 24E, respectively. The winding terminal ends (right ends in the drawing) of the secondary windings N2A, N2B, and N2C are connected to secondary terminals 24B, 24D, and 24F, respectively.

As shown in FIG. 4(A), the primary windings N1A to N1C are connected in parallel by connecting the primary terminals 26A, 26C, and 26E to which the winding start ends thereof are connected. This parallel circuit is connected to the high-frequency driving circuit 10. The primary windings N1A, N1B, and N1C included in the transformer module T2 are connected to the ground via the primary terminals 26B, 26D, and 26F, respectively, to which the winding terminal ends thereof are connected. The above-described connection method is changed in accordance with a switching circuit used. The secondary winding N2B included in the transformer module T2 is connected to the common electrode via the secondary terminal 24C to which the winding start end thereof is connected. On the other hand, the secondary windings N2A and N2C are connected to the independent electrodes via the secondary terminals 24B and 24F, respectively, to which the winding terminal ends thereof are connected. A current detection circuit may be connected between the winding terminal ends of the secondary windings N2A to N2C and the ground. Here, the current detection circuits 8A and 8B are connected between the secondary terminals 24A and 24E and the ground, respectively. Thus, the transformer module T2 is configured so that the AC output voltage supplied from the secondary winding N2B connected to the common electrode and the AC output voltages supplied from the secondary windings N2A and N2C connected to the independent electrodes can be opposite in polarity.

Furthermore, the secondary winding N2B, which is connected to the common electrode, is disposed on the bobbin 23B into which the center magnetic legs of the E-shaped magnetic cores are inserted. The secondary windings N2A and N2C, which are connected to the independent electrodes, are disposed on the bobbins 23A and 23C, respectively, into each of which the outer magnetic legs of the E-shaped magnetic cores are inserted. Two closed magnetic paths represented by arrows in FIG. 4(C) are generated. The secondary windings N2A and N2C are included in different closed magnetic paths, and therefore independently output voltages. Consequently, output characteristics of the secondary windings N2A and N2C, which are connected to the independent electrodes, are equalized. Furthermore, the diameter of the secondary winding N2B is larger than that of the secondary windings N2A and N2C (not shown). The core cross-sectional area of the center magnetic leg is larger than that of the other outer magnetic legs (not shown). The above-described configuration prevents a copper loss that occurs in the secondary winding N2B through which a mixed current passes and prevents iron losses that occur in the cores, thereby reducing a temperature increase.

Thus, modularization is performed by disposing three secondary windings and three primary windings in the transformer module T2 so as to reduce the number of components and a footprint for transformers.

The high-frequency driving circuit 10 included in the discharge tube lighting circuit 25 shown in FIG. 4(A) generates a primary voltage having a rectangular wave from a DC voltage supplied from a power supply included in an electronic apparatus, and applies the generated primary voltage to the primary windings NiA to N1C included in the transformer module T2.

The capacitors C1A, C1B, and C1C included in the discharge tube lighting circuit 25 are connected between the secondary windings N2A, N2B, and N2C included in the transformer module T2 and the ground, respectively. The capacitors C1A to C1C series-resonate with the leakage inductance of the transformer module T2 at startup of the backlight, and apply a high voltage required for lighting of the backlight to the U-shaped discharge tubes 2A and 2B.

Thus, the backlight 21 according to this embodiment and the discharge tube lighting circuit 25 according to this embodiment cause the U-shaped discharge tubes 2A and 2B to emit light. It is desirable that the number of turns, a turns ratio, the degree of coupling between the primary side and the secondary side, and a leakage inductance of the transformer module T2 be controlled so that the output characteristics of the secondary windings N2A to N2C are almost the same. In addition, it is desirable that the capacitances of the capacitors C1A to C1C be controlled so that the output characteristics of the secondary windings N2A to N2C are almost the same.

In this embodiment, an exemplary configuration has been described in which secondary terminals each of which is connected to one of the independent electrodes or the common electrode are arranged in a staggered format so that the AC output voltages applied to the independent electrodes and the AC output voltage applied to the common electrode can be opposite in polarity. However, the description is not limited to such a configuration. For example, the secondary terminals 24A, 24C, and 24E may be connected to the power supply electrodes, and the secondary terminals 24B, 24D, and 24F may be connected to the ground. In this case, a winding direction of the secondary winding is alternately changed. In this embodiment, a single transformer has two primary terminals and two secondary terminals. However, the ground terminal of the secondary winding may be disposed as a primary terminal, so that the number of secondary terminals is reduced to one.

Next, a discharge tube lighting circuit for activating two U-shaped discharge tubes according to a third embodiment will be described by way of example. This discharge tube lighting circuit with a simplified primary winding circuit configuration is provided with a transformer module T3. The transformer module T3 is provided with the same magnetic cores, the same bobbins, and the same secondary windings as those included in the transformer module T2 according to the second embodiment, and only one primary winding.

Figure 5:
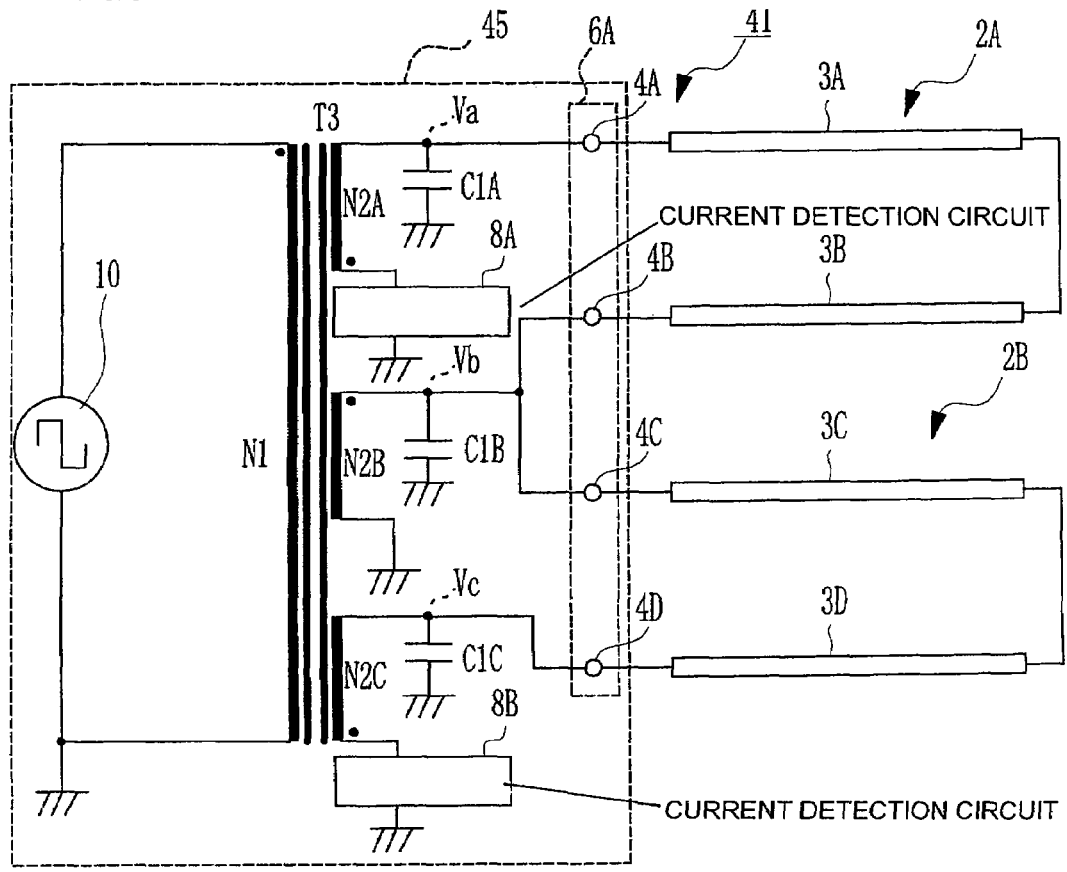
FIG. 5 is a diagram describing configurations of a discharge tube lighting circuit according to a third embodiment and a transformer module according to the third embodiment.
Figure 5:
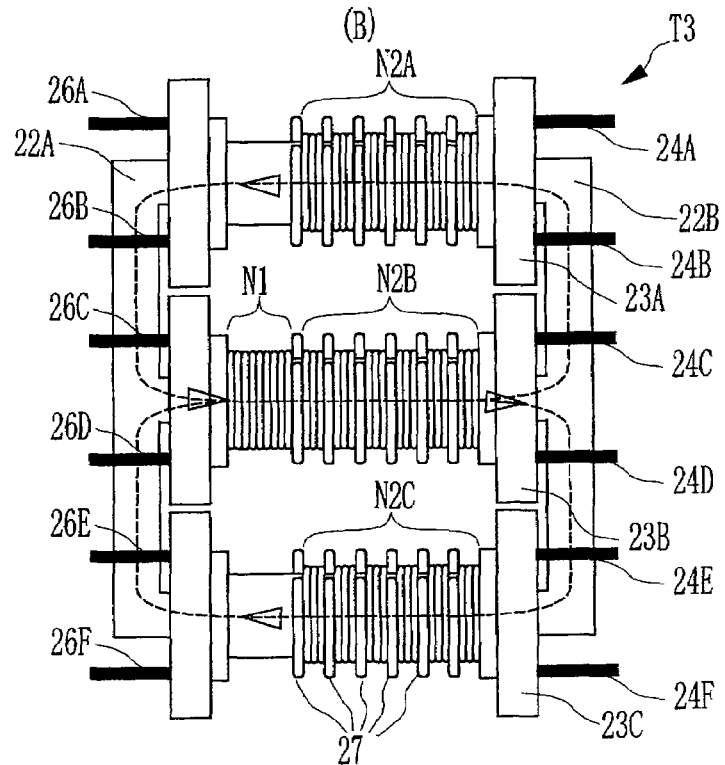

A backlight 41 whose circuit configuration is shown in FIG. 5(A) is used for a liquid crystal display device, and is provided with the U-shaped discharge tubes 2A and 2B and a discharge tube lighting circuit 45. The U-shaped discharge tubes 2A and 2B are connected to the discharge tube lighting circuit 45 via the connector 6A.

The connector 6A includes the power supply electrodes 4A to 4D. The power supply electrodes 4A and 4D are independent electrodes. The power supply electrodes 4B and 4C form a common electrode using a connection line (not shown) disposed on a mounting substrate.

The discharge tube lighting circuit 45 that is an inverter disposed on the mounting substrate generates an AC voltage of a predetermined frequency from a DC voltage supplied from a power supply (not shown) included in an electronic apparatus. The discharge tube lighting circuit 45 is provided with the connector 6A, the capacitors C1A to C1C, the transformer module T3 obtained by winding the primary winding N1A and the secondary windings N2A to N2C around a pair of magnetic cores, the current detection circuits 8A and 8B, and the high-frequency driving circuit 10.

Here, the detailed configuration of the transformer module T3 included in the discharge tube lighting circuit 45 is shown in FIG. 5(B). FIG. 5(B) is a schematic diagram. The transformer module T3 is provided with two E-shaped magnetic cores 22A and 22B, three bobbins 23A to 23C, the primary winding N1, and the secondary windings N2A to N2C. The E-shaped magnetic cores 22A and 22B each including three magnetic legs are similar in shape, and form closed magnetic paths in which the three magnetic legs of the E-shaped magnetic core 22A individually abut against the three magnetic legs of the E-shaped magnetic core 22B. The three magnetic legs of each of the E-shaped magnetic cores 22A and 22B are individually inserted in the bobbins 23A to 23C.

In a region at one end of the bobbin 23B which includes one of a plurality of sections divided by the dividers 27, the primary winding N1 is wound. The winding start end (the left end in the drawing) of the primary winding N1 is connected to the primary terminal 26C. The winding terminal end (the right end in the drawing) of the primary winding N1 is connected to the primary terminal 26D. In regions (at the other ends) of the bobbins 23A to 23C which include the other sections divided by the dividers 27, each of which is smaller than the above-described section, the secondary windings N2A to N2C are individually wound while being extracted. The winding start ends (the left ends in the drawing) of the secondary windings N2A, N2B, and N2C are connected to the secondary terminals 24A, 24C, and 24E, respectively. The winding terminal ends (the right ends in the drawing) of the secondary windings N2A, N2B, and N2C are connected to the secondary terminals 24B, 24D, and 24F, respectively. Like the second embodiment, the number of primary terminals may also be increased by disposing the ground terminals of the secondary windings as primary terminals in this embodiment.

As shown in FIG. 5(A), the primary winding N1 is connected to the high-frequency driving circuit 10 via the primary terminal 26C to which the winding start end thereof is connected. The primary winding N1 is connected to the ground via the primary terminal 26D to which the winding terminal end thereof is connected. This connection method is changed in accordance with a switching circuit used. The secondary winding N2B included in the transformer module T3 is connected to the common electrode via the secondary terminal 24C to which the winding start end thereof is connected, and is connected to the ground via the secondary terminal 24D to which the winding terminal end thereof is connected. On the other hand, the secondary windings N2A and N2C are connected to the independent electrodes via the secondary terminals 24B and 24F, respectively, to which the winding terminal ends thereof are connected. The current detection circuits 8A and 8B are connected between the secondary terminals 24A and 24E, to which the winding start ends of the secondary windings N2A and N2C are connected, and the ground, respectively. Thus, the transformer module T3 is configured so that the AC output voltage supplied from the secondary winding N2B connected to the common electrode and the AC output voltages supplied from the secondary windings N2A and N2C connected to the independent electrodes can be opposite in polarity.

Furthermore, the secondary winding N2B connected to the common electrode and the primary winding N1 are disposed on the bobbin 23B into which the center magnetic legs of the E-shaped magnetic cores are inserted. The secondary windings N2A and N2C, which are connected to the independent electrodes, are disposed on the bobbins 23A and 23C, respectively, into each of which the outer magnetic legs of the E-shaped magnetic cores are inserted. In addition, two closed magnetic paths represented by arrows in FIG. 5(B) are generated. The secondary windings N2A and N2C are included in different closed magnetic paths, and therefore independently output voltages. Consequently, output characteristics of the secondary windings N2A and N2C, which are connected to the independent electrodes, are equalized. Furthermore, the diameter of the secondary winding N2B is larger than that of the secondary windings N2A and N2C (not shown). Still furthermore, the core cross-sectional area of the center magnetic leg is larger than that of the other outer magnetic legs (not shown). Consequently, a copper loss that occurs in the secondary winding N2B through which a mixed current passes and iron losses that occur in the cores are prevented, and a temperature increase is reduced.

Thus, modularization is performed by disposing a single primary winding in the transformer module T3 so as to reduce the number of primary winding components.

The high-frequency driving circuit 10 included in the discharge tube lighting circuit 45 shown in FIG. 5(A) generates a primary voltage having a rectangular wave from a DC voltage supplied from the power supply included in the electronic apparatus, and applies the generated primary voltage to the primary winding N1 included in the transformer module T3.

The resonant capacitors C1A, C1B, and C1C included in the discharge tube lighting circuit 45 are connected between the secondary windings N2A, N2B, and N2C included in the transformer module T3 and the ground, respectively. The resonant capacitors C1A to C1C series-resonate with the leakage inductance of the transformer module T3 at startup of the backlight, and apply a high voltage required for lighting of the backlight to the U-shaped discharge tubes 2A and 2B.

Thus, the backlight 41 according to this embodiment and the discharge tube lighting circuit 45 according to this embodiment cause the U-shaped discharge tubes 2A and 2B to emit light. It is desirable that the number of turns, a turns ratio, the degree of coupling between the primary side and the secondary side, and a leakage inductance of the transformer module T3 be controlled so that the output characteristics of the secondary windings N2A to N2C are almost the same. In addition, it is desirable that the capacitances of the capacitors C1A to C1C be controlled so that the output characteristics of the secondary windings N2A to N2C are almost the same.

Effective lighting circuits can be achieved irrespective of configurations of transformers used and transformer modules used. For example, a lighting circuit can be suitably achieved using the configuration of the transformer module provided with a single magnetic leg for a primary winding and three magnetic legs for secondary windings which is disclosed in Japanese Unexamined Patent Application Publication No. 2001-126937, or a configuration of a transformer module opposite to the configuration shown in the third embodiment in which primary windings are individually wound around the bobbins 23A and 23C and no primary winding is wound around the bobbin 23B. In addition, a lighting circuit can be suitably achieved using a configuration in which a plurality of primary windings are wound in multiplex winding so as to dispose more than three primary windings.

Although particular embodiments have been described, many other variations and modifications and other uses will become apparent to those skilled in the art. Therefore, the present invention is not limited by the specific disclosure herein.

What is claimed is:

1. A discharge tube lighting circuit for use with two discharge tubes each having a first terminal and a second terminal, said lighting circuit comprising:
   a high-frequency driving circuit;
   first, second and third transformers each including a primary winding and a secondary winding, the primary windings being connected in parallel to the high-frequency driving circuit;
   a first electrode for being connected to the first terminal of one of the two discharge tubes;
   a second electrode for being connected to the first terminal of the other one of the two discharge tubes; and
   a third electrode for being connected in common to the second terminals of the two discharge tubes, and
   wherein the secondary winding included in the first transformer is connected to the first electrode, the secondary winding included in the second transformer is connected to the second electrode, and the secondary winding included in the third transformer is connected to the third electrode;
   said transformers being polarized for generating voltages to be applied to the first and second electrodes that are the same in polarity, and for generating a voltage to be applied to the third electrode that is opposite in polarity to the voltages to be applied to the first and second electrodes.

2. The discharge tube lighting circuit according to claim 1, wherein a diameter of the secondary winding included in the third transformer is larger than diameters of the secondary windings included in the first and second transformers.

3. The discharge tube lighting circuit according to claim 2, wherein a core cross-sectional area of the third transformer is larger than a core cross-sectional area of the first and second transformers.

4. The discharge tube lighting circuit according to claim 1, wherein a core cross-sectional area of the third transformer is larger than a core cross-sectional area of the first and second transformers.

5. The discharge lighting circuit according to claim 1, further comprising two U-shaped discharge tubes each having a first terminal and a second terminal;
   said first electrode being connected to the first terminal of one of the two U-shaped discharge tubes;
   said second electrode being connected to the first terminal of the other one of the two U-shaped discharge tubes; and
   said third electrode being connected in common to the second terminals of the two U-shaped discharge tubes.

6. The discharge tube lighting circuit according to claim 5, wherein the two U-shaped discharge tubes have respective resonance voltages based on parasitic capacitances distributed between the secondary windings and the first to third electrodes, and leakage inductances of the first to third transformers.

7. The discharge tube lighting circuit according to claim 1, wherein the first to third transformers have a common magnetic core that forms a closed magnetic path, and the secondary windings included in the first to third transformers are individually wound around the common magnetic core.

8. The discharge tube lighting circuit according to claim 7, wherein one or two primary windings are wound around the common magnetic core, and are magnetically coupled to all of the secondary windings included in the first to third transformers.

9. The discharge tube lighting circuit according to claim 8, wherein one primary winding is wound around the common magnetic core, and is magnetically coupled to all of the secondary windings included in the first to third transformers, and
   wherein the common magnetic core has at least three magnetic legs, the secondary windings included in the first to third transformers are individually wound around different magnetic legs, and the one primary winding is wound around any one of the magnetic legs around which the secondary windings are wound or another magnetic leg around which no secondary winding is wound.

10. An electronic apparatus having a backlight comprising the discharge tube lighting circuit, and discharge tubes driven by the discharge tube lighting circuit, according to claim 5.

11. An electronic apparatus having a backlight comprising the discharge tube lighting circuit according to claim 1, and further comprising a discharge tube driven by the discharge tube lighting circuit.

* * * * *